Sept. 24, 1929.  R. L. GEIGER  1,729,380
BRACE RELEASE
Filed March 7, 1928
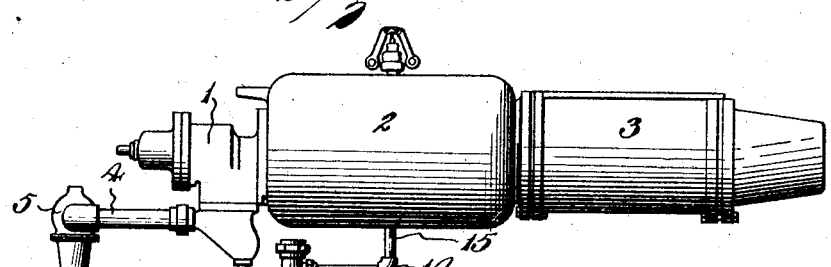
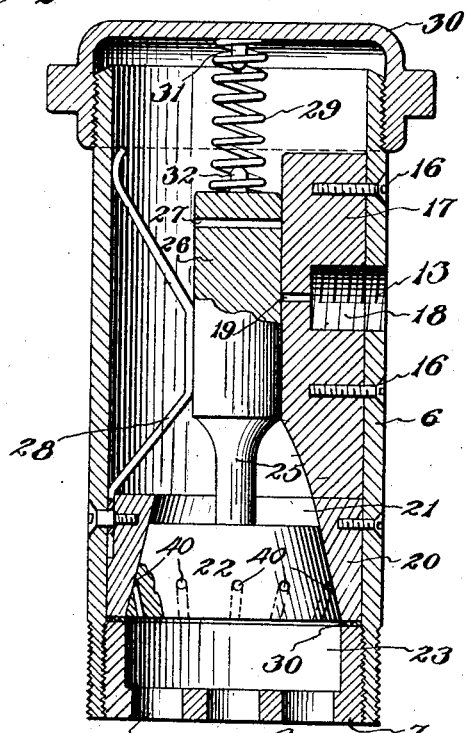
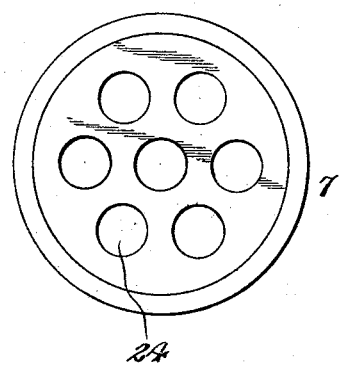
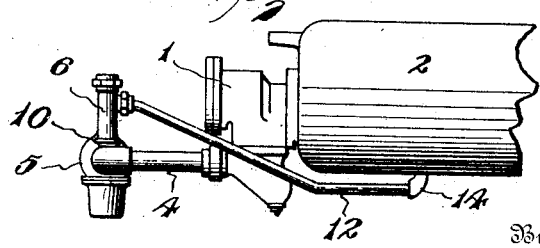
Inventor
R. L. Geiger
By Lacey & Lacey, Attorneys Patented Sept. 24, 1929

1,729,380

UNITED STATES PATENT OFFICE

RAY L. GEIGER, OF COVINGTON, INDIANA

BRAKE RELEASE

Application filed March 7, 1928. Serial No. 259,872.

This invention relates to air brakes and has for its object the provision of a very simple and inexpensive device which will operate automatically to release the brakes after a car has been separated from a train and is to be shifted. In the operation of air brakes, the brakes are applied by a reduction of pressure in the train line or brake pipe which reduction is effected by manipulation of the engineer's valve in the cab of the locomotive. The reduction of pressure in the train line operates through the triple valve and the auxiliary reservoir to move the piston of the brake cylinder to braking position and the brakes will be held in the applied position by the pressure in the auxiliary reservoir for a considerable period, frequently being so held for twenty-four hours. Under these conditions, it is necessary to bleed the auxiliary reservoir in order to release the brakes and permit the car to be shifted from track to track or otherwise moved about and standard equipment now includes a bleeder valve which is mounted upon the auxiliary reservoir but is operated manually by a member of the train crew and requires that the trainman hold the valve in the open position until the proper reduction in the auxiliary reservoir has been effected. The object of my invention, therefore, is to provide means whereby, after a car with the brakes applied is cut out from a train, the auxiliary reservoir will be bled automatically so that the brakes will be released. The invention is illustrated in the accompanying drawing and will be hereinafter fully set forth.

In the drawing:

Figure 1 is an elevation of a triple valve, auxiliary reservoir and brake cylinder having my invention applied thereto;

Fig. 2 is an enlarged vertical section through the automatic bleeder valve;

Fig. 3 is a top plan view of the rest for the automatic valve, and

Fig. 4 is a view similar to Fig. 1 showing a different method of applying the invention.

In the drawing, the reference numeral 1 indicates a triple valve, 2 designates the auxiliary reservoir and 3 the brake cylinder of a standard air brake equipment, the air being supplied to the triple valve through a pipe 4 which is connected with the train line and has interposed therein an air filter 5, all of which is now common practice. In carrying out my invention, there is provided a cylinder 6 which is threaded at its lower end both externally and internally so that a cap 7 may be secured in said lower end and the cylinder may be threaded into a fitting provided in the standard equipment. In Fig. 1, the cylinder 6 is shown as threaded into a fitting 8 which is provided on the end of a pipe 9 having its opposite end threaded into the triple valve casing and substituted for the usual drain plug. In Fig. 4, the cylinder 6 is secured in a fitting 10 which is interposed in the pipe 4 between the air filter and the triple valve. In both arrangements, a pipe 11 or 12 is coupled at one end to the side of the cylinder 6, at the port 13 therein, and at its opposite end is connected to an elbow 14 which is engaged in the drain port of the auxiliary reservoir either directly, as shown in Fig. 4, or through a short connecting pipe 15, as shown in Fig. 1.

Within the cylinder 6, there is secured by cap bolts 16 a valve seat 17 which has a socket or port 18 formed in its outer side and adapted to register with the port 13 in the cylinder and communicates through a restricted passage 19 with the interior of the cylinder. Immediately below said valve seat, a seat ring 20 is secured in the cylinder and the bore of this ring is flared downwardly, as shown at 21, to form a seat for an upwardly tapered valve 22. The cap 7 has a bore 23 of a diameter equal to the maximum diameter of the flared opening 21 and through the bottom of the cap openings 24 are provided so that air from the train line may pass into the cylinder to act upon the valve 22, a gasket 130 being inserted between the cap and the ring 20 to prevent leakage of air around the ring. Rising centrally from the valve 22 is a stem 25 which carries an elongated valve head 26 having a constricted passage 27 extending diametrically therethrough near its upper end and said head bears against the valve seat 17, as clearly shown in Fig. 2, the opposed surfaces of the seat and the valve head being flat and given a smooth finish so that a comparatively leak-proof joint will be provided. The valve head is held to the seat by a spring 28 disposed between the head and the wall of the cylinder and preferably secured at its lower end to the seat ring 20, as shown, and an expansion spring 29 is disposed between the upper end of the valve head 26 and a cap 30 which is secured over the upper end of the cylinder to close the same, centering studs 31 and 32 being provided on the cap and the valve head, as shown, to retain the spring in its proper position.

When the brake system is in operation, the bleeding valve is held in the position shown in Fig. 2, inasmuch as the air in the pipe 4 is at the same pressure as the air in the train line and said pipe communicates with the lower end of the cylinder 6 through the fitting 10 or through the base of the triple valve casing and the pipe 9 so that the valve 22 will be held seated in the ring 20 and the passage 27 in the valve head will be above and out of alinement with the passage 19 of the valve seat 17, thereby preventing outflow from the auxiliary reservoir. It will be understood that this position of the release valve will be maintained at all times during the ordinary operation of the brakes inasmuch as the pressure in the train line then never falls below thirty pounds per square inch, and this pressure is sufficient to maintain the valve 22 raised and seated against the force of its own weight and the spring 29. When a car is to be cut out from a train, it is customary for a trainman to set the cut-out cocks usually provided in the system between the train line and the triple valve so that, if the brakes have been released, the pressure will be maintained in the brake pipe and the brakes will not be applied. However, there is usually a slight leakage in the cut-out cock and it has been found that the brakes will generally be applied in a short while and will be held applied by the pressure in the auxiliary reservoir, as has been heretofore stated. When the brake unit is equipped with my improved automatic valve, if the cut-out cock be opened, the pressure in the pipe supplying the triple valve will be obviously reduced and eventually said pipe will be entirely freed of the compressed air. When the pressure in the feed line has thus been reduced, the valve 22 will drop by its own weight and by the expansion of the spring 29 so that the port 27 will be brought into alinement with the port 19 and communication thereby established between the auxiliary reservoir and the empty train line so that the air in the auxiliary reservoir may bleed therefrom to reduce the auxiliary reservoir pressure and release the brakes, it thereby becoming unnecessary for the trainman to remain at the car during the bleeding operation and he is at liberty to perform other duties. To insure escape of the air when the valve 22 rests upon the cap 7, a plurality of small openings are formed through the valve, as indicated at 40. When air is admitted to the brake pipe to fill the system, the valve 22 is forced upward quickly to its seat so that any air which may flow past the valve will be insufficient to prevent seating and will have no effect except to aid slightly in holding the slide 17 to its seat. The openings 40, of course, are closed by the seat 20 when the valve is fully raised and any slight leakage which may occur cannot build up sufficient pressure above the valve to overcome the pressure from the brake pipe below it and interfere with the operation. It will be readily noted that the device is exceedingly simple in construction and operation and may be very readily applied to any standard equipment at a very low cost.

Having thus described the invention, I claim:

1. The combination with the auxiliary reservoir of an air brake equipment, of a valve casing interposed between the reservior and the source of compressed air supply and communicating at its lower end with the source of compressed air supply, a connection between the auxiliary reservoir and the upper portion of the casing, and a valve slidably mounted within the casing and exposed to the pressure fluid to be held normally across the connection between the casing and the auxiliary reservoir whereby to close said connection and operable by gravity upon withdrawal of the pressure to open said connection and permit bleeding of the reservoir.

2. A device for the purpose set forth comprising a casing having a port in one side, means for connecting said port with an auxiliary reservoir, a perforated cap in the lower end of the casing, means for connecting the lower end of the casing with a source of fluid pressure supply whereby the pressure will be transmitted through the perforations of the cap, a valve seat within the casing having a passage communicating with the port in the side of the casing, a downwardly flared valve seat in the lower portion of the casing, and a valve exposed to the pressure admitted through the perforations in the cap and comprising an upwardly tapered body disposed within and seating in the flared valve seat, and a valve head carried by said body and bearing against the first-mentioned valve seat and having a port therethrough adapted to register with the port in said seat.

3. A bleeder valve for the purpose stated comprising a casing adapted at its lower end to be fitted to a fluid pressure pipe and having openings at its lower end to admit the fluid pressure, a seat ring secured in the casing above the lower end thereof and having a downwardly flared bore, a valve seat secured in the casing above said seat ring and having a port extending transversely therethrough, means for connecting said port with an auxiliary reservoir, a tapered valve body disposed within the seat ring and adapted to seat in the bore thereof, an elongated valve head disposed above and carried by said body and bearing against the upper valve seat and provided with a diametrical port adapted to aline with the port through said seat, an expansion spring disposed between the upper end of the valve head and the upper end of the cylinder, and a spring secured to the cylinder and bearing against the valve head to hold the head to its seat.

In testimony whereof I affix my signature.

RAY L. GEIGER. [L. S.]